Dec. 13, 1932.   S. V. HITE   1,890,607
DEPTH INDICATOR AND INCLINOMETER
Filed April 12, 1929   2 Sheets-Sheet 1

INVENTOR
Samuel V. Hite
BY Loyal J. Miller
ATTORNEY

Dec. 13, 1932.     S. V. HITE     1,890,607
DEPTH INDICATOR AND INCLINOMETER
Filed April 12, 1929     2 Sheets-Sheet 2

INVENTOR
Samuel V. Hite
BY Loyd J. Miller
ATTORNEY

Patented Dec. 13, 1932

1,890,607

UNITED STATES PATENT OFFICE

SAMUEL V. HITE, OF SEMINOLE, OKLAHOMA

DEPTH INDICATOR AND INCLINOMETER

Application filed April 12, 1929. Serial No. 354,473.

My invention relates to instruments for measuring the depth and amount of deviation from the vertical of oil and gas wells.

The principal objects of my invention are to provide a device of this character which is new, novel, practical, and of utility; to provide a cylindrical shell which at all points is made to assume the direction of a well casing or drill pipe by means of wheels in contact with the inner walls of said casing or drill pipe; to provide a method of registering the angle of deviation of the casing or drill pipe from the vertical by means of a pendulum doubly pivoted; to provide a recording tape which will make and keep a permanent record of the amount of declination of the well in degrees; to provide means upon said recording tape for showing the depth of any and all of said declinations; which will enable the driller to ascertain from such device the point and depth of deviation of such well from the vertical for the purpose of straightening said well; which will assist in obtaining straight wells so that the sucker rods will operate therein when production is obtained; which will be economical; which will confine a well to the property sought to be drilled; which will be efficient in accomplishing all of the purposes for which it is intended.

In the oil industry where wells are drilled several thousand feet in depth there is at present, within the knowledge of the petitioner, no exact method of determining if the hole is straight and vertical or to what degree it is crooked nor the direction of such deviation. In some instances wells which on the surface were several hundred feet apart have met at great depths under the surface. Such a crooked hole is not only longer than a straight hole would be, but if the said hole is too badly out of alignment it would not be practical to put the well on the pump as the sucker rod could not function properly in a crooked hole. My invention gives an accurate record as to the positions of all deviations from the vertical.

Figure 1:
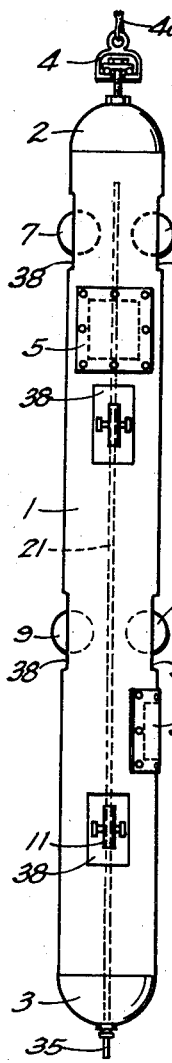
Figure 2:
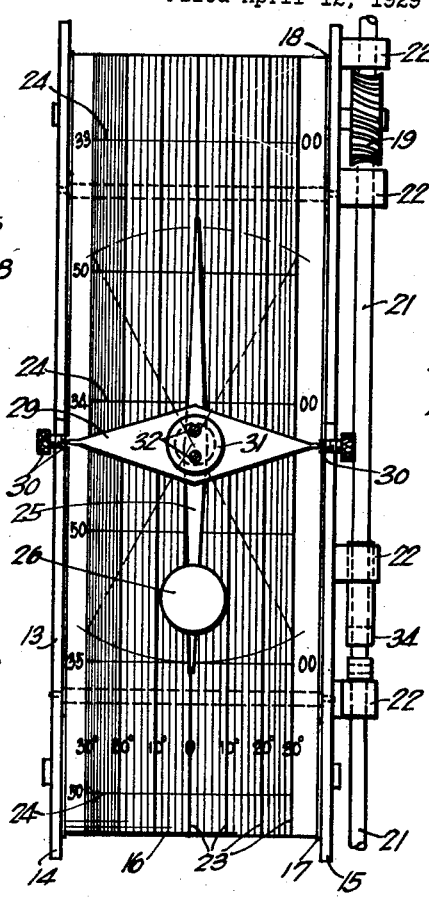
Figure 3:
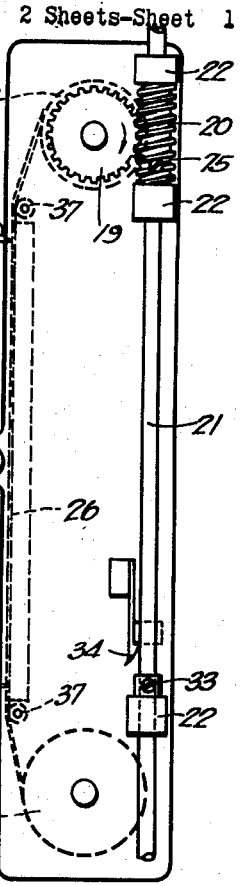
Figure 4:
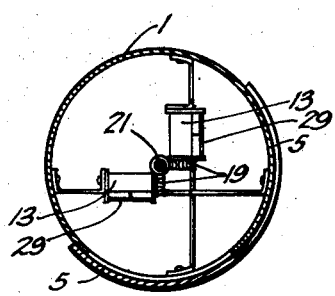
Figure 5:
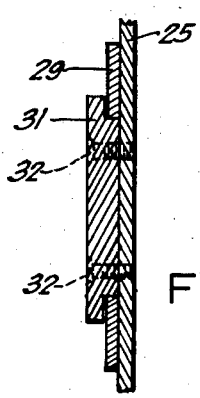
Figure 6:
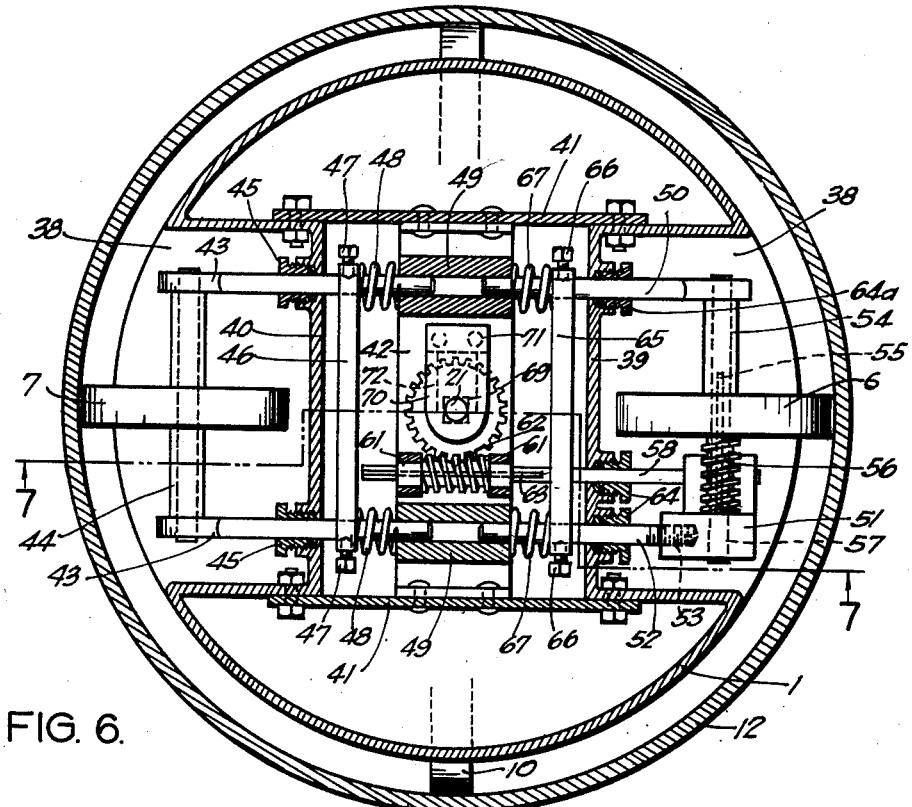
Figure 7:
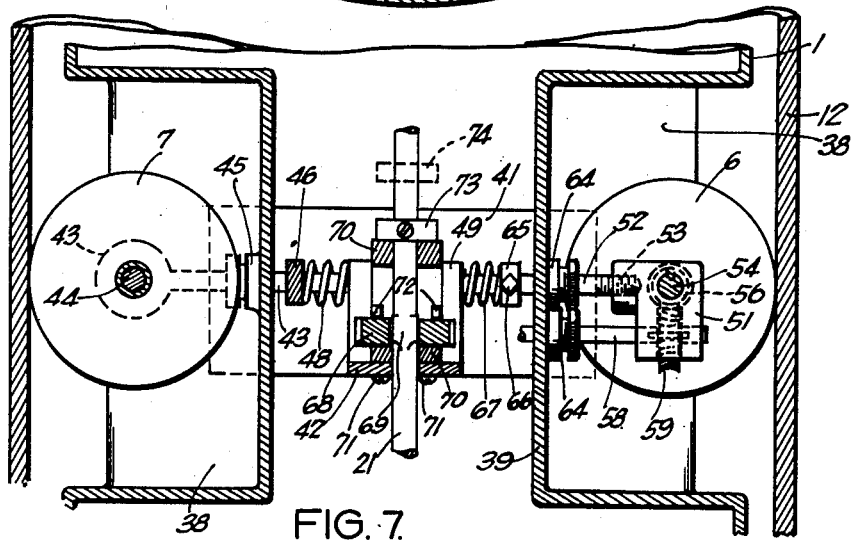
Figure 8:
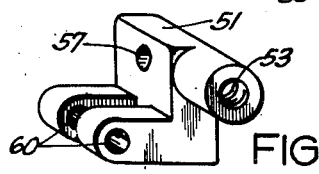

With these and other objects in view as will more fully appear my invention consists in the construction, novel features, and combination of parts hereinafter more fully described, pointed out in the claims hereto appended, and illustrated in the accompanying sheets of drawings, of which, Figure 1 is an elevational view of the cylindrical shell; Fig. 2 is a front elevational view of the recording mechanism; Fig. 3 is a side elevational view of the recording mechanism; Fig. 4 is a horizontal sectional view showing the two recording devices at right angles to each other; Fig. 5 is a fragmentary sectional view of recording arm; Fig. 6 is a horizontal sectional view showing power take-off; Fig. 7 is a sectional view on the line 7—7 of Fig. 6 and Fig. 8 is a perspective view of the bearing for the drive wheel shaft, worm gear, jack shaft and wheel guide.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings includes a cylindrical shell or cartridge 1 having hemispherical ends 2 and 3 and a connection 4 for attaching to the lowering cable 4a. The said lower end 3 may be weighted to insure the shell 1 passing through any oil, water or mud confined within the well casing 12. Hand-holes 5 give access to the interior of said shell 1. A plurality of pairs of wheels as can best be seen in Fig. 1, numbered 6, 7, 8, 9, 10 and 11, are set so as to have rolling contact with the interior of said casing 12 at intervals of 90 degrees around the circumference of the said casing 12. The recording mechanism 13 consists of the side-frame members 14 and 15, the doubly graduated recording tape 16 reeled around supply spool 17, and after receiving the record the said tape 16 is wound up on spool 18 by means of worm wheel 19 actuated by worm 20 driven by the long drive shaft 21 which extends down through shell 1, lower end 3 and terminates at 35. The said shaft 21 passes through bracket bearings 22 on member 15. As can best be seen in Fig. 2, recording tape 16 is graduated by longitudinal lines 23 into spaces representing degrees of declination from zero at the center to 30 degrees on both sides. These lines may be spaced at intervals of 1 degree as at the left or 2 degrees as at the right in Fig. 2. Transverse lines 24 indicate the depth at which readings on tape 16 are recorded. Through a system of reduction gears to be explained presently, shaft 21, worm 20 and worm wheel 19 turn spool 18 at a speed in direct ratio to the distance, traveled by the shell 1, so that lines 24 measure the exact length of casing through which shell 1 has passed in being lowered into the well and thus constitute a depth indicator. Pendulum 25 provided with weight 26, has inking contact point 27 at its lower extremity and a similar point 28 at its upper extremity. By using different colored inks, such as blue for 27 and red for 28, a double record will be secured when the pendulum deviates in either direction from the vertical. As can best be seen in Fig. 4, the recording mechanisms 13 operate in pairs set at right angles to each other, and any desired number of pairs may be used, all driven from master drive shaft 21, the different pairs being placed in different vertical planes so that regardless of whether the casing is leaning or cork-screwed a record will be taken of all its deviations. The pendulum 25 is adjustably supported by cross member 29 pivoted in needle bearings 30 for motion in a plane at right angles to tape 16 and by bearing 31 secured by screws 32 at the center of member 29 for motion in the plane of said tape 16, this arrangement permits freedom of motion of the inking points 27 and 28 in response to every change of direction of the casing 12. By driving master shaft 21 by a plurality of wheels such as 6, 8, 10, and 11, no two of said wheels will be passing a joint in said casing 12 at the same time and a continuous and uninterrupted record will result. I provide a set-screwed collar 33 on shaft 21 which will engage with catch 34 when end 35 of shaft 21 strikes the bottom of the well and throws the driving mechanism out of gear as will presently be explained. As can best be seen in Fig. 3, I provide a smooth, rigid surface 36 over which tape 16 must pass while pointers 27 and 28 are marking the record, rollers 37 serve to guide said strip while passing over surface 36.

Referring more particularly to Figs. 1, 6 and 7 it can be seen that contacting rollers 6, 7, 8, 9, 10 and 11 are positioned within recesses 38 in shell 1. The inner walls 39 and 40 of said recess 38 are connected by supporting plates 41, and riveted to plates 41 is cross frame 42. Idling wheel 7 and counter-balancing drive wheel 6 are mounted on reciprocating bearings and stems 43 and are supported by and turns on sleeved axle 44. Said bearing stems 43 pass through stuffing boxes 45 in wall 40 and are connected by cross-link 46 secured by set screws 47 within shell 1. Coiled compression springs 48 on said stems 43 bear against said link 46 and retrieving socket block 49 into which said stems 43 operatively project. In a similar manner drive wheel 6 has reciprocating bearing and stem 50 at one end but a special bearing block 51, shown in perspective in Fig. 8, at the other end of its sleeved axle 54. A reciprocating guide rod 52 secured in threaded hole 53 of block 51 passes through a stuffing box 64 in wall 39 as does stem 50 also through a stuffing box 64a. Said members 50 and 52 are connected by cross-link 65 secured at each of its ends by set screws 66, and have springs 67 which operatively project into said socket block 49. Drive wheel 6 is secured to axle 54 by key 55 and turns worm 56 which drives worm wheel 59. The end of axle 54 has bearing in perforation 57 of block 51. Jack shaft 58 passes through a stuffing box 64 in wall 39 and is supported by bearings 60 on block 51 and bearings 61 on cross frame 42. Worm 62 is secured to shaft 58 by sliding key 63. This arrangement of reciprocating stems permits wheels 6 and 7 to have in and out diametrical motion, provides positive rolling contact over joints or other irregularities in the well, permits said wheels to operate in oil, water or mud but excludes said oil, water and mud from the interior of shell 1 where the delicate recording mechanism 13 is fully protected.

Worm 62 on jack shaft 58 drives worm wheel 68 which actuates master shaft 21 in driving said worm 20 which operates through worm wheel 19 to wind up recording tape 16. As can best be seen in Figs. 6 and 7 shaft 21 has a square section 69 which registers in a square hole in worm wheel 68. Bearings 70 secured to member 42 by screws 71, support shaft 21 and said worm wheel 68. Lugs 72 on bearing 70 prevent worm wheel 68 from moving upward. Collar 73 set screwed to shaft 21 rests on bearing 70 when the mechanism is in gear but when the shell 1 has reached the bottom of the well and end 35 strikes the bottom, master shaft 21 and collar 73 takes the position indicated in dotted lines at 74, the square section 69 is forced up out of registry with the said square hole in said worm wheel 68, the said wheel 68 idles on shaft 21 without turning it, the said shaft 21 is held out of gear by collar 33 and catch 34 better seen in Fig. 3. Set screw 75 on worm 20 having sliding motion in a key way on shaft 21. No motion is transmitted from the wheels to the recording mechanism as shell 1 is withdrawn from the well and the completed record can be removed at the mouth of the well without having been disturbed in its ascent.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. A device of the class described, having in combination, a thermetically sealed cylindrical shell connecting a supporting cable, a plurality of wheels operatively anchored on said shell adapted for peripherical contact with the interior of a well casing or drill pipe, for controlling the orientation of said shell, recording mechanism including a traveling tape within said shell and driven by some of said wheels for automatically receiving a register of the declination of said casing from the vertical upon said tape, and a pair of pens for registering said declination upon said tape, said pens mounted upon a pendulum pivotally mounted within said shell and adapted to swing in all directions.

2. The combination with a hermetically sealed shell adapted to be lowered into a well, of a pair of tape carrying rolls operably mounted within said shell, one of said rolls adapted to receive the tape from the other roll across a plane surface parallel with the axis of said shell, means for driving said rolls by contact with the well wall, a pendulum pivoted substantially at its mid-point adjacent said plane surface, and a pair of marking pens one each upon each end of said pendulum, said pendulum pivoted in a manner causing one of said pens to mark on said tape when the shell is disposed at an angle in one direction and causing the other pen to mark on said tape when the shell is disposed at an angle in the opposite direction, and in a manner free to swing in two other directions, said pens adapted to remain out of contact with said tape when said shell is in a vertical position.

3. The combination with a hermetically sealed shell adapted to be lowered into a well, of a pair of tape carrying rolls operably mounted within said shell, one of said rolls adapted to receive the tape from the other roll across a plane surface parallel with the axis of said shell, means for driving said rolls by contact with the well wall, a pendulum pivoted substantially at its mid-point adjacent said plane surface, a pair of marking pens one each upon each end of said pendulum, said pendulum pivoted in a manner causing one of said pens to mark on said tape when the shell is disposed at an angle in one direction and causing the other pen to mark on said tape when the shell is disposed at an angle in the opposite direction, and in a manner free to swing in two other directions, said pens adapted to remain out of contact with said tape when said shell is in a vertical position, and means for disconnecting said driving means when shell reaches the bottom of a well.

4. Organization as described in claim 3, in which said driving disconnecting means comprises, a slidable shaft hermetically protruding through the bottom of said shell for contacting the bottom of a well and disengaging the driving mechanism.

5. A device of the class described having in combination, a hermetically sealed shell adapted to be lowered on a cable into a well, a pair of tape carrying rolls operably mounted within said shell, one of said rolls adapted to receive the tape from the other roll across a plane surface parallel with the axis of said shell, means for driving said rolls by contact with the well wall, a pendulum pivoted substantially at its mid-point adjacent said plane surface, a pair of marking pens one each upon each end of said pendulum, said pendulum pivoted in a manner causing one of said pens to mark on said tape when the shell is disposed at an angle in one direction and causing the other pen to mark on said tape when the shell is disposed at an angle in the opposite direction, and in a manner free to swing in two other directions, said pens adapted to remain out of contact with said tape when said shell is in a vertical position, and means for disconnecting said driving means when shell reaches the bottom of a well.

SAMUEL V. HITE.